(12) United States Patent
Mosley et al.

(10) Patent No.: US 8,171,717 B2
(45) Date of Patent: May 8, 2012

(54) MODEL-BASED COORDINATED AIR-FUEL CONTROL FOR A GAS TURBINE

(75) Inventors: Matthew John Mosley, Simpsonville, SC (US); Christopher Eugene Long, Greer, SC (US); David Spencer Ewens, Greer, SC (US)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 12/780,187

(22) Filed: May 14, 2010

(65) Prior Publication Data

US 2011/0277482 A1    Nov. 17, 2011

(51) Int. Cl.
*F02C 9/00* (2006.01)
*F02K 3/00* (2006.01)

(52) U.S. Cl. .............................. 60/39.27; 60/240; 60/773
(58) Field of Classification Search ................. 60/39.27, 60/39.24, 39.281, 790, 773, 764, 243, 240, 60/239, 238, 237, 235, 233
See application file for complete search history.

(56) References Cited

U.S. PATENT DOCUMENTS

| | | | | |
|---|---|---|---|---|
| 3,797,233 A * | 3/1974 | Webb et al. ..................... 60/791 |
| 4,048,964 A * | 9/1977 | Kissel ............................ 123/482 |
| 4,139,887 A * | 2/1979 | Levesque, Jr. .................. 700/41 |
| 4,550,565 A * | 11/1985 | Ozono ........................ 60/39.182 |
| 4,809,497 A * | 3/1989 | Schuh .......................... 60/39.27 |
| 4,928,482 A * | 5/1990 | Pollak et al. ..................... 60/792 |
| 4,928,484 A * | 5/1990 | Peczkowski .................... 60/240 |
| 4,947,643 A * | 8/1990 | Pollak et al. .................... 60/236 |
| 5,060,469 A * | 10/1991 | Klaass et al. .................... 60/773 |
| 5,133,182 A * | 7/1992 | Marcos .......................... 60/792 |
| 5,327,718 A * | 7/1994 | Iwata et al. ..................... 60/773 |
| 5,487,265 A * | 1/1996 | Rajamani et al. ............... 60/773 |
| 5,636,507 A * | 6/1997 | Rajamani et al. ............... 60/773 |
| 6,167,690 B1 * | 1/2001 | Hepner et al. .................. 60/773 |
| 6,704,620 B1 * | 3/2004 | Kutzner et al. ................ 700/287 |
| 6,817,186 B2 * | 11/2004 | Tanaka ........................... 60/773 |
| 7,000,376 B2 * | 2/2006 | Barisione et al. .......... 60/39.281 |
| 7,191,588 B2 * | 3/2007 | Tanaka et al. ................ 60/39.27 |
| 7,245,040 B2 * | 7/2007 | Mukavetz et al. .............. 290/52 |

* cited by examiner

*Primary Examiner* — Ehud Gartenberg
*Assistant Examiner* — Gerald Sung
(74) *Attorney, Agent, or Firm* — Pearne & Gordon LLP

(57) ABSTRACT

A coordinated air-fuel controller and associated method provide a fuel controller, a combustion air controller and a steady-state air versus fuel model. The fuel controller generates a fuel control output signal and the combustion air controller generates a combustion air control output signal. The fuel controller determines a preliminary fuel control signal based on at least one of first and second loop control signals, and determines the fuel control output signal based on the preliminary fuel control signal. The steady-state air versus fuel model processes the preliminary fuel control signal to determine an expected steady-state combustion air control signal. The combustion air controller determines a preliminary combustion air control signal based on at least one of a third loop control signal and a fourth loop control signal, and determines the combustion air control output signal based on the preliminary combustion air control signal and the expected steady-state combustion air control signal.

23 Claims, 3 Drawing Sheets

MODEL-BASED COORDINATED AIR-FUEL CONTROL FOR A GAS TURBINE

BACKGROUND OF THE INVENTION

1. Field of the Invention

The present invention relates to control systems for gas turbines, and in particular to a control system having both a fuel controller and a combustion air controller.

2. Description of Prior Art

Gas turbines are commonly coupled to electric generators to drive the generator. It is known to control the amount of fuel and air supplied to a combustion chamber of the gas turbine using a cross channel controller. Known cross channel controllers operate on a turbine speed error signal that is an input to a fuel supply controller. Such cross channel controllers process the speed error signal, and the resulting processed speed error signal is added to a turbine exhaust temperature error signal. The sum of the turbine exhaust temperature error signal and processed speed error signal is processed by an air supply controller using a transfer function, to generate a control signal that controls air supplied to the combustion chamber. See, for example, U.S. Pat. No. 5,487,265 (Jan. 30, 1996) and U.S. Pat. No. 5,636,507 (Jun. 10, 1997).

BRIEF DESCRIPTION OF THE INVENTION

In accordance with one aspect, the present invention provides a control system for a gas turbine. The control system includes a fuel control actuator and a combustion air control actuator. A coordinated air-fuel controller (CAF) controls operations of the fuel control actuator and the combustion air control actuator. The coordinated air-fuel controller receives a plurality of gas turbine condition input signals and determines, based on the input signals, a first error signal, a second error signal, a third error signal and a fourth error signal. The coordinated air-fuel controller includes a fuel controller, a combustion air controller and a steady-state air versus fuel model. The fuel controller provides a fuel control output signal to the fuel control actuator to control operations of the fuel control actuator. The fuel controller processes the first error signal using a first transfer function to obtain a first loop control signal, and processes the second error signal using a second transfer function to obtain a second loop control signal. The fuel controller determines a preliminary fuel control signal based on at least one of the first loop control signal and the second loop control signal, and determines the fuel control output signal based on the preliminary fuel control signal. The combustion air controller provides a combustion air control output signal to the combustion air control actuator to control operations of the combustion air control actuator. The steady-state air versus fuel model communicates with the fuel controller and processes the preliminary fuel control signal to determine an expected steady-state combustion air control signal. The combustion air controller processes the third error signal using a third transfer function to obtain a third loop control signal and processes the fourth error signal using a fourth transfer function to obtain a fourth loop control signal. The combustion air controller determines a preliminary combustion air control signal based on at least one of the third loop control signal and the fourth loop control signal, and determines the combustion air control output signal based on the preliminary combustion air control signal and the expected steady-state combustion air control signal.

In accordance with another aspect, the present invention provides a method of controlling air supply and fuel supply in a gas turbine. A first error signal is generated based on a first condition of the gas turbine. A second error signal is generated based on a second condition of the gas turbine. A third error signal is generated based on a third condition of the gas turbine. A fourth error signal is generated based on a fourth condition of the gas turbine. The first error signal is processed according to a first transfer function to obtain a first loop control signal. The second error signal is processed according to a second transfer function to obtain a second loop control signal. The third error signal is processed according to a third transfer function to obtain a third loop control signal. The fourth error signal is processed according to a fourth transfer function to obtain a fourth loop control signal. A preliminary fuel control signal is generated based on at least one of the first loop control signal and the second loop control signal. A fuel control output signal is generated based on the preliminary fuel control signal. The fuel control output signal is provided to a fuel control actuator. The fuel control actuator adjusts a fuel flow based on the fuel control output signal. A steady-state air versus fuel model is provided. The steady-state air versus fuel model generates, from the preliminary fuel control signal, an expected steady-state combustion air control signal. A preliminary combustion air control signal is generated based on at least one of the third loop control signal and the fourth loop control signal. A combustion air control output signal is generated based on the preliminary combustion air control signal and the expected steady-state combustion air control signal. The combustion air control output signal is provided to a combustion air control actuator. The combustion air control actuator adjusts an amount of combustion air based on the combustion air control output signal.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
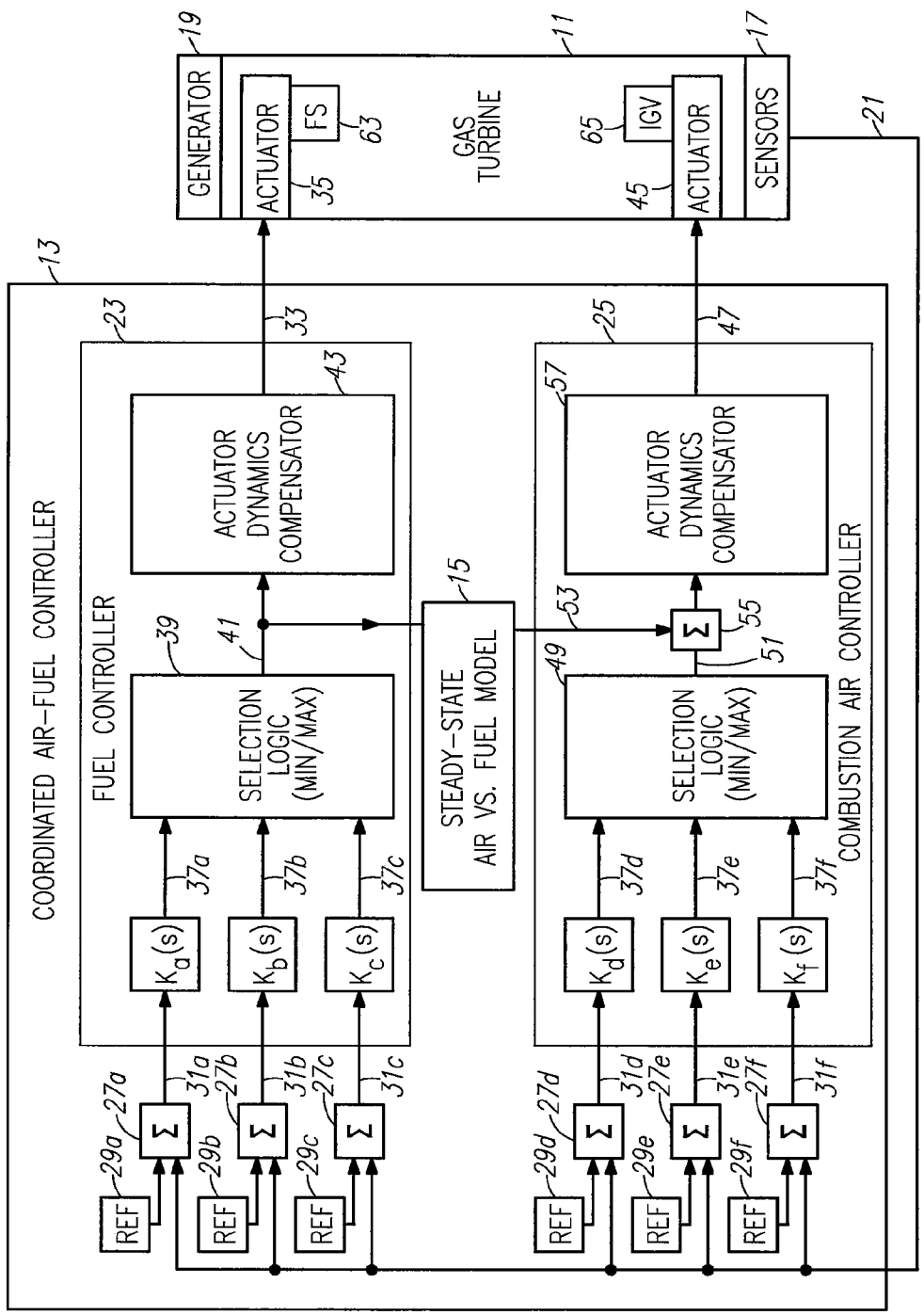
FIG. 1 is a schematic diagram of a gas turbine and a control system for the gas turbine.

Features and aspects of the present invention will now be described more fully hereinafter with reference to the accompanying drawings in which example embodiments are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Various signals are discussed below. It is to be appreciated that the signals can be analog signals, digital signals or data values stored in a memory location, such as a register. Various circuits and portions of circuits are discussed below. It is to be appreciated that the circuits and portions of circuits can be implemented via discrete electrical components, integrated circuits, and/or through the execution of program instructions by a processor.

The technical effect of the present invention is an improvement on a Coordinated Air-Fuel (CAF) Control function used in heavy-duty gas turbine controls. The CAF function coordinates the control of air and fuel during grid frequency transients to avoid issues like lean blowout, exhaust overtemperature, and compressor surge.

A challenge with known gas turbine coordinated air-fuel controllers is that coordination of the inputs to the air supply and fuel supply controllers does not necessarily coordinate their outputs, air and fuel demand, respectively. One reason for this is that the relationship between turbine speed error and turbine exhaust temperature error is not intuitive, making the cross channel controller difficult to design and tune. Another reason is that constraints within the fuel supply controller may make the turbine speed error a poor indicator of impending fuel supply changes.

Known cross channel controllers operate in "control error space," linking the speed error and the exhaust temperature error. However, a correct relationship between speed error and exhaust temperature error is difficult to determine. A better approach is to have the cross channel controller operate in "demand space," which is located after respective control transfer functions operating on the error signals in the control channels. The cross channel controller in demand space can utilize a direct relationship between air and fuel, such as a steady-state air versus fuel model, to coordinate air and fuel supply. A correct relationship between air and fuel can be easier to determine than a correct relationship between error signals. Therefore, a coordinated air-fuel controller having a cross channel controller located in demand space can be easier to design and tune than known cross channel controllers. Having the cross channel controller in demand space also enables it to reflect constraints within the fuel supply controller.

FIG. 1 is a schematic diagram of a gas turbine 11 and a coordinated air-fuel controller 13 for the gas turbine that includes a cross channel controller operating in a demand space portion of the controller 13. The cross-channel controller in FIG. 1 is a steady-state air versus fuel model 15. As will be described further below, the steady-state air versus fuel model 15 provides a relationship between fuel supply for the gas turbine and combustion air supply under steady-state conditions.

The gas turbine 11 has a plurality of sensors 17 for sensing various conditions associated with the gas turbine. Example sensors include a speed sensor for sensing a rotational speed of the gas turbine, a temperature sensor for sensing the temperature of the exhaust gas of the gas turbine, a power level sensor for sensing power supplied by an electrical generator 19 driven by the gas turbine, and a pressure sensor for sensing the gas turbine's compressor pressure. Additional sensors for sensing further conditions associated with the gas turbine can be provided as desired. Estimations of conditions associated with the gas turbine may also take the place of direct sensors. The sensors 17 provide feedback signals 21 as inputs to the controller 13.

The coordinated air-fuel controller 13 will now be discussed in detail. The coordinated air-fuel controller 13 can include sub-controllers, such as a cross-channel controller (e.g., the steady-state air versus fuel model 15), a fuel controller 23 and a combustion air controller 25. The controller 13 can be an electronic controller and can include one or more processors. For example, the controller 13 can include one or more of a microprocessor, a microcontroller, a digital signal processor (DSP), an application specific integrated circuit (ASIC), a field-programmable gate array (FPGA), discrete logic circuitry, or the like. The controller 13 can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controller 13 can further include one or more analog-to-digital (A/D) converters for processing various analog inputs to the controller.

The controller 13 includes error calculators 27a-27f. The feedback signal 21 from each sensor 17 is input to a respective error calculator 27a-27f for comparison to an associated reference value 29a-29f. The output of the error calculators 27a-27f are error signals 31a-31f that are indicative of the difference between the sensed condition and the reference value. For example, the sensed rotational speed of the gas turbine can be compared to a speed reference to determine a rotational speed error signal, and the sensed exhaust gas temperature of the gas turbine can be compared with a temperature reference to determine an exhaust temperature error signal. The reference values 29a-29f can be boundary values or target values. Boundary values establish limiting operating conditions that should not be passed if possible, such as a maximum temperature or pressure or a minimum speed. Target values establish desired operating conditions, such as a desired speed.

In FIG. 1, three error calculators 27a-27c respectively provide error signals 31a-31c as inputs to the fuel controller 23, and three error calculators 27d-27f respectively provide error signals 31d-31f as inputs to the combustion air controller 25. It is to be appreciated that more or fewer than three error calculators can provide error signals to the fuel controller 23 and the combustion air controller 25, and that the fuel controller and combustion air controller need not have the same number of associated error calculators.

The error signals 31a-31c are processed by the fuel controller 23 in order to generate a fuel control output signal 33. The fuel controller 23 provides the fuel control output signal 33 to a fuel control actuator 35 on the gas turbine, to control operations of the fuel control actuator. The fuel control actuator 35 responds to the fuel control output signal 33 to control the amount of fuel provided to the combustion chamber of the gas turbine. The fuel control actuator 35 can control, for example, a fuel stroke 63 of one or more fuel valves, based on a fuel stroke reference (FSR) signal from the fuel controller 23. The fuel controller 23 controls the amount of fuel provided to the combustion area by controlling the operations of the fuel control actuator 35.

The fuel controller 23 processes the error signals 31a-31c using respective transfer functions $K_a(s)$-$K_c(s)$. The transfer functions $K_a(s)$-$K_c(s)$ can each implement a proportional-integral (PI) control scheme, a proportional-integral-derivative (PID) control scheme, or other control schemes as desired.

Loop fuel control signals 37a-37c, which are output from the transfer functions $K_a(s)$-$K_c(s)$, are provided to selection logic 39 of the fuel controller 23. Via the selection logic 39, the fuel controller 23 determines a preliminary fuel control signal 41 based on at least one of the loop fuel control signals 37a-37c. The selection logic 39 can provide an algorithm for selecting one of the loop fuel control signals 37a-37c as the preliminary fuel control signal 41. The selection logic can prioritize one loop fuel control signal over another in selecting a loop fuel control signal as the preliminary fuel control signal 41, or compare signals to determine which one has a higher/smaller value. Example selection logic could be: max (min(37a, 37b), 37c). In this case, loop fuel control signals 37a and 37b are compared, the smaller of the two (37a, 37b) is further compared to signal 37c, and the larger signal is selected as the preliminary fuel control signal 41. Such an algorithm can be useful when gas turbine boundary conditions are established, such as maximum temperature/pressure, minimum operating speed, etc. The selection logic 39 can compare the loop fuel control signals 37a-37c based on the priority of the boundary conditions and select a loop fuel control signal as the preliminary fuel control signal 41 such that the gas turbine operates within some or all of the boundary conditions. If desired, the selection logic can mathematically combine (e.g., add, average together, etc.) two or more of the loop fuel control signals 37a-37c to obtain the preliminary fuel control signal 41.

The fuel controller 23 can optionally include an actuator dynamics compensator 43. The actuator dynamics compensator 43 processes the preliminary fuel control signal 41 to compensate for response characteristic differences between the fuel control actuator 35 and a combustion air control actuator 45. The combustion air control actuator 45 controls the amount of air provided to the combustion chamber of the gas turbine 11. The fuel control actuator 35 and the combustion air control actuator 45 can have different response characteristics. For example, the fuel control actuator 35 may be able to change the fuel flow rate more quickly than the combustion air control actuator 45 can change the amount of air provided to the combustion chamber. In this case, the actuator dynamics compensator 43 can delay changing the fuel control output signal 33 by adding a delay to the preliminary fuel control signal 41. The actuator dynamics compensator 43 is optional and in embodiments lacking the actuator dynamics compensator, the preliminary fuel control signal 41 is equal or identical to the fuel control output signal 33.

Turning to the combustion air controller 25, the combustion air controller generates a combustion air control output signal 47. The combustion air controller 25 provides the combustion air control output signal 47 to the combustion air control actuator 45 on the gas turbine 11, to control operations of the combustion air control actuator. The combustion air control actuator 45 responds to the combustion air control output signal 47 to control the amount of air provided to the combustion chamber of the gas turbine 11. The combustion air control actuator 45 can control, for example, the position (e.g., angle) of inlet guide vanes 65 of the gas turbine 11. The combustion air controller 25 controls the amount of air provided to the combustion area by controlling the operations of the combustion air control actuator 45.

The combustion air controller 25 processes the error signals 31d-31f using respective transfer functions $K_d(s)$-$K_f(s)$. Similar to the transfer functions $K_a(s)$-$K_c(s)$, the transfer functions $K_d(s)$-$K_f(s)$ can implement a desired control scheme, such as a PI or PID control scheme for example. Loop combustion air control signals 37d-37f are output from the transfer functions $K_d(s)$-$K_f(s)$ and are provided to selection logic 49 in the combustion air controller 25. Via the selection logic 49, the combustion air controller 25 determines a preliminary combustion air control signal 51. Similar to the selection logic 39 in the fuel controller 23, the selection logic 49 can provide an algorithm for selecting one of the loop combustion air control signals 37d-37f as the preliminary combustion air control signal 51. The selection logic can prioritize one loop combustion air control signal over another in selecting a loop combustion air control signal as the preliminary combustion air control signal 51, or compare signals to determine which one has a higher/smaller value. Example selection logic could be: max(min(37d, 37e), 37f). The selection logic can be established based on gas turbine operational boundary conditions related to exhaust temperature, compressor pressure ratio, etc. The selection logic 49 can compare the loop combustion air control signals 37d-37f based on the priority of the boundary conditions and select a loop combustion air control signal as the preliminary combustion air control signal 51 such that the gas turbine operates within some or all of the boundary conditions. If desired, the selection logic can mathematically combine (e.g., add, average together, etc.) two or more of the loop combustion air control signals 37d-37f to obtain the preliminary combustion air control signal 51.

The steady-state air versus fuel model 15, which operates in a demand space portion of the coordinated air-fuel controller 13, communicates with both of the fuel controller 23 and the combustion air controller 25. The steady-state air versus fuel model 15 receives the preliminary fuel control signal 41 from the fuel controller 23 and calculates an expected steady-state combustion air control signal 53 based on the preliminary fuel control signal 41. The steady-state air versus fuel model 15 provides the expected steady-state combustion air control signal 53 to the combustion air controller 25. Although not shown in the figures, the steady-state air versus fuel model 15 may include automatic adaptation to actual steady-state conditions. In other words, the model may be automatically adjusted to remove any steady-state differences between the combustion air control output signal 47 and the expected steady-state combustion air control signal. This adaptation improves the accuracy of the steady-state air versus fuel model 15.

The combustion air controller 25 receives the expected steady-state combustion air control signal 53 from the steady-state air versus fuel model 15. The combustion air controller 25 determines the combustion air control output signal 47 based on one or both of the preliminary combustion air control signal 51 and the expected steady-state combustion air control signal 53. For example, the combustion air controller 25 can include a summing circuit 55 for combining the preliminary combustion air control signal 51 and the expected steady-state combustion air control signal 53 to determine the combustion air control output signal 47. The preliminary combustion air control signal 51 and the expected steady-state combustion air control signal 53 can be added together by the summing circuit 55, and the output of the summing circuit 55 is the combustion air control output signal 47. Optionally, as shown in FIG. 1, the combustion air controller 25 can include an actuator dynamics compensator 57 that processes the output from the summing circuit 55 to compensate for response characteristic differences between the fuel control actuator 35 and the combustion air control actuator 45. If the actuator dynamics compensator 57 is present, then the output of the actuator dynamics compensator 57 is the combustion air control output signal 47, rather than the output of the summing circuit 55 directly.

Other methods besides a summing circuit 55 may be used to combine the preliminary combustion air control signal 51 and the expected steady-state combustion air control signal 53. For example, the combination may be done via an algorithm that weights one input over the other, depending on the circumstance.

The expected steady-state combustion air control signal 53 serves to coordinate operations of the fuel controller 23 and the combustion air controller 25. Such coordination may reduce the likelihood that various adverse conditions of the gas turbine will occur. For example, such coordination may reduce the likelihood of lean blowout, exhaust over temperature and compressor surge.

Figure 2:
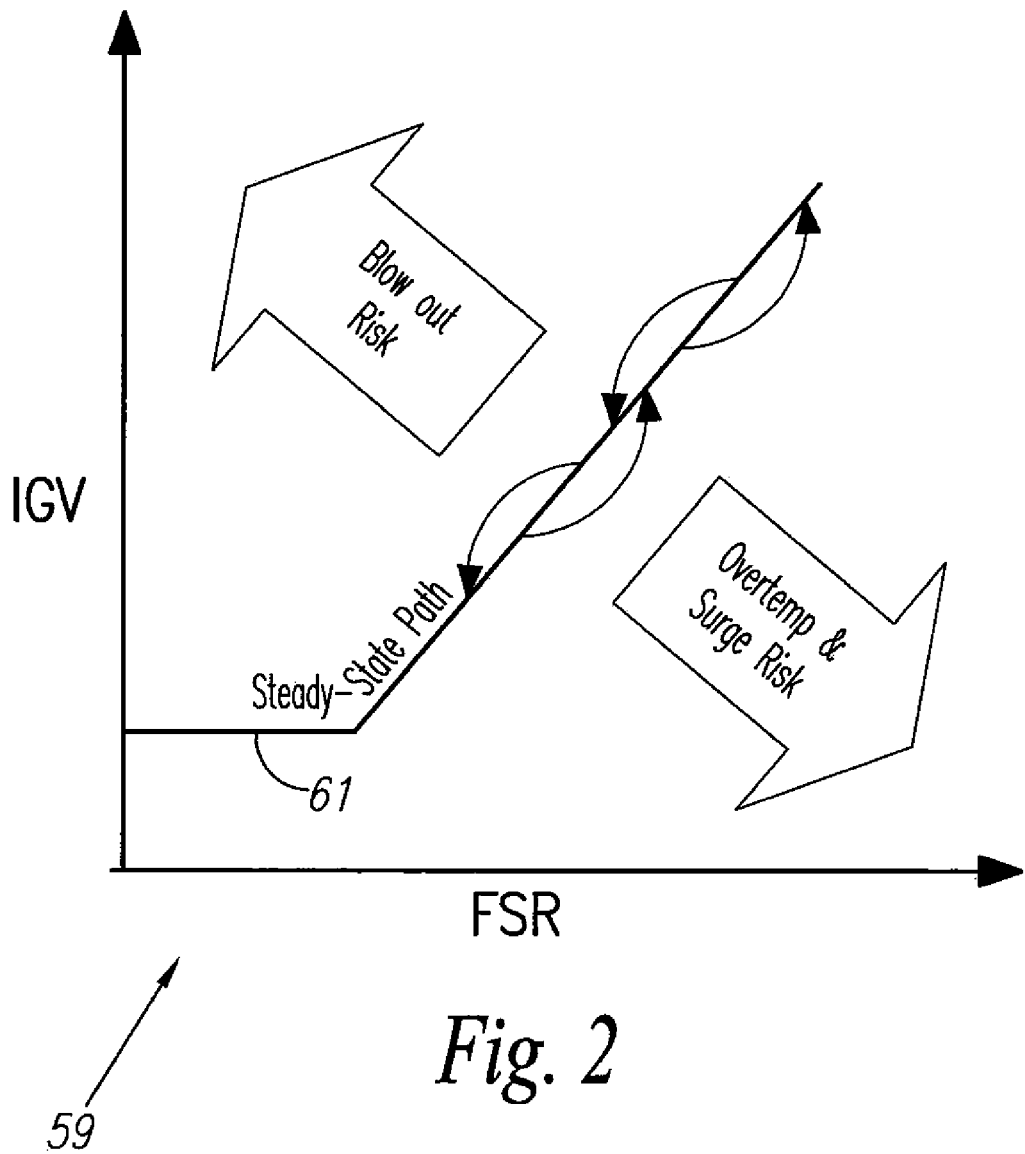
FIG. 2 is a graph showing inlet guide vane position versus fuel stroke reference.

The steady-state air versus fuel model 15 uses its model to calculate the expected steady-state combustion air control signal 53 from the preliminary fuel control signal 41. As shown in FIG. 2, the air versus fuel model 59 can relate inlet guide vane position (IGV) to fuel stroke reference (FSR). Alternatively, the air versus fuel model can directly relate airflow to fuel flow. The preliminary fuel control signal 41 directly or indirectly controls the fuel control actuator 35. For a given preliminary fuel control signal 41, the steady-state air versus fuel model 15 determines and outputs a corresponding expected steady-state combustion air control signal 53 using the air versus fuel model. It is to be appreciated that the air versus fuel model can be implemented via an algorithm using a mathematical equation, via a lookup table, or via other known modeling techniques.

As shown in FIG. 2, the model 59 can provide a steady-state correspondence between FSR and IGV. The steady-state air versus fuel model 15 will output the expected steady-state combustion air control signal 53 to maintain the operation of the gas turbine 11 generally along the steady-state path 61 shown and compensate for fast transient conditions (fast deviations from the from the steady-state path 61). Deviations from the steady state path, for example too high or too low an IGV value for a given FSR, shown schematically by bent arrows in FIG. 2, can result in the occurrence of adverse conditions such as lean blow out, exhaust over-temperature and compressor surge.

In FIG. 2, the steady-state path 61 is piecewise linear. The steady-state path 61 has a horizontal portion in which IGV is constant over a low range of FSR. After the horizontal portion, the steady-state path 61 has a constant positive slope as FSR increases. It is to be appreciated that the steady-state path can have curved portions or a combination of straight and curved portions.

Figure 3:
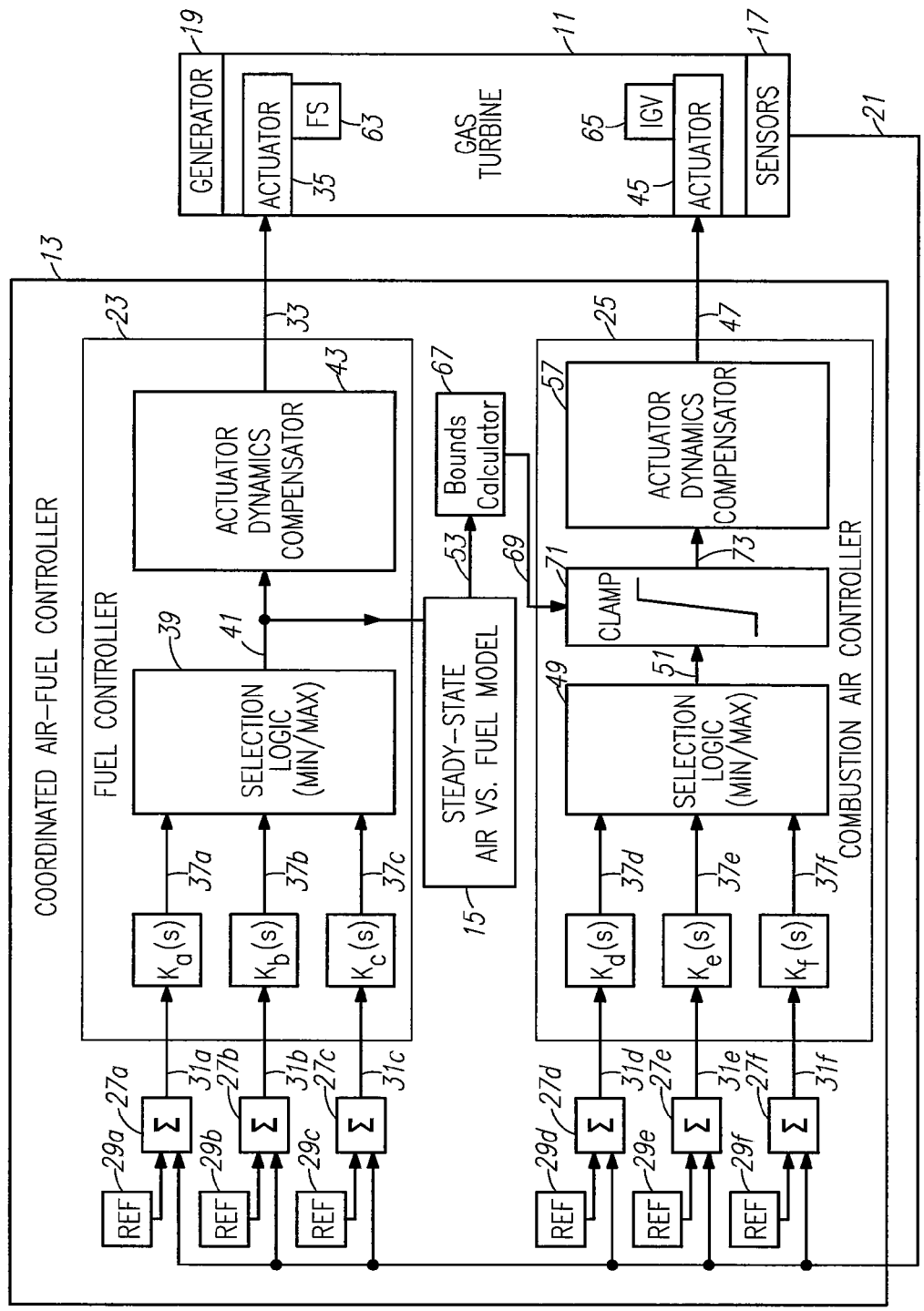
FIG. 3 is a schematic diagram of a gas turbine and a control system for the gas turbine.

FIG. 3 is a schematic diagram of a gas turbine 11 and a coordinated air-fuel controller 13. The coordinated air-fuel controller 13 shown in FIG. 3 is similar to that shown in FIG. 1. However, in FIG. 3, the expected steady-state combustion air control signal 53 is provided to a bounds calculator 67, rather than directly to the combustion air controller 25. The bounds calculator 67 determines a variable bias to be applied to the expected steady-state combustion air control signal 53. The bounds calculator 67 adds and subtracts the bias to and from the expected steady-state combustion air control signal 53, to output upper and lower bounds for the preliminary combustion air control signal 51. The upper and lower bound signals 69 are provided to a clamping portion 71 along with the preliminary combustion air control signal. The output 73 of the clamping portion is the preliminary combustion air control signal 51 clamped by the upper and lower bound signal(s) 69. When the preliminary combustion air control signal 51 is within the bounds, the output 73 of the clamping portion equals the preliminary combustion air control signal. When the preliminary combustion air control signal 51 is above the upper bound or below the lower bound, the output 73 of the clamping portion equals the upper or lower bound, respectively.

In an embodiment according to FIG. 3 that lacks the optional actuator dynamics compensator 57, the output 73 of the clamping portion is the combustion air control output signal 47. In an embodiment according to FIG. 3 that includes the optional actuator dynamics compensator 57, the output 73 of the clamping portion is provided to the actuator dynamics compensator 57, which processes the output 73 to compensate for response characteristic differences between the fuel control actuator 35 and the combustion air control actuator 45.

The bias used to determine the bounds is variable. The bounds calculator 67 analyzes the rate of change of the expected steady-state combustion air control signal 53. If the rate of change of the expected steady-state combustion air control signal 53 is low, a steady-state or near steady-state condition is occurring and the bias is set relatively large. Setting the bias relatively large allows the transfer functions Kd(s)-Kf(s) to dominate in the control of the combustion air control output signal 47, rather than the expected steady-state combustion air control signal 53. If the rate of change of the expected steady-state combustion air control signal 53 is high, a fast transient condition is occurring and the bias is set relatively small or to 0. Setting the bias margin relatively small allows the expected steady-state combustion air control signal 53 to dominate in the control of the combustion air control output signal 47, rather than the transfer functions Kd(s)-Kf(s). During a fast transient condition, it may be desirable to ignore the loop combustion air control signals 37d-37f and control the combustion air control output signal 47 based on the expected steady-state combustion air control signal 53 in accordance with the model 59.

It is to be appreciated that the clamping portion 71 may not be entirely downstream of selection logic 49, but rather integrated into it. One or more of the loop combustion air control signals 37d-37f may operate downstream of the clamping portion. For example, the input to the clamping portion could be max(37d,37e) while the output of the clamping portion is compared to 37f and the lower of the two becomes the input to the actuator dynamics compensator. This effectively gives the control loop producing 37f higher priority than the upper and lower bound signals 69 coming from the bounds calculator 67.

In sum, the present invention provides a model-based coordinated air-fuel control for a gas turbine.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:
1. A control system for a gas turbine, including:
a fuel control actuator;
a combustion air control actuator;
a coordinated air-fuel controller that controls operations of the fuel control actuator and the combustion air control actuator, wherein the coordinated air-fuel controller receives a plurality of gas turbine condition input signals and determines, based on the input signals, a first error signal, a second error signal, a third error signal and a fourth error signal, and wherein the coordinated air-fuel controller includes:
a fuel controller that provides a fuel control output signal to the fuel control actuator to control operations of the fuel control actuator,
wherein the fuel controller processes the first error signal using a first transfer function to obtain a first loop control signal,
wherein the fuel controller processes the second error signal using a second transfer function to obtain a second loop control signal, and
wherein the fuel controller determines a preliminary fuel control signal based on at least one of the first loop control signal and the second loop control signal, and determines the fuel control output signal based on the preliminary fuel control signal;

a combustion air controller that provides a combustion air control output signal to the combustion air control actuator to control operations of the combustion air control actuator; and a cross-channel controller in communication with the fuel controller, wherein the cross-channel controller processes the preliminary fuel control signal according to an air versus fuel model, to determine an expected steady-state combustion air control signal;

wherein the combustion air controller processes the third error signal using a third transfer function to obtain a third loop control signal, wherein the combustion air controller processes the fourth error signal using a fourth transfer function to obtain a fourth loop control signal, and wherein the combustion air controller determines a preliminary combustion air control signal based on at least one of the third loop control signal and the fourth loop control signal, and determines the combustion air control output signal based on the preliminary combustion air control signal and the expected steady-state combustion air control signal.

2. The control system of claim 1, wherein the coordinated air-fuel controller includes a bounds calculator for determining upper and lower bounds applied to the preliminary combustion air control signal, wherein the bounds calculator determines the upper and lower bounds based on a rate of change of the expected steady-state combustion air control signal.

3. The control system of claim 1, wherein the air versus fuel model is automatically adjusted, removing a difference between the combustion air control output signal and the expected steady-state combustion air control signal.

4. The control system of claim 1, wherein at least some of the gas turbine condition input signals are based on estimated conditions.

5. The control system of claim 1, wherein at least some of the gas turbine condition input signals are provided by sensors associated with the gas turbine.

6. The control system of claim 5, wherein said sensors associated with the gas turbine include a speed sensor that senses a rotational speed of the gas turbine and generates a speed signal, and a temperature sensor that senses exhaust temperature of the gas turbine and generates a temperature signal.

7. The control system of claim 1, wherein the fuel controller includes an actuator dynamics compensator that compensates for response characteristic differences between the fuel control actuator and the combustion air control actuator, and wherein the actuator dynamics compensator processes the preliminary fuel control signal to determine the fuel control output signal.

8. The control system of claim 7, wherein, in determining the fuel control output signal, the actuator dynamics compensator adds a delay to the preliminary fuel control signal.

9. The control system of claim 1, wherein the fuel control output signal is equal to the preliminary fuel control signal.

10. The control system of claim 1, wherein the combustion air controller includes an actuator dynamics compensator that compensates for response characteristic differences between the fuel control actuator and the combustion air control actuator.

11. The control system of claim 1, wherein the combustion air control actuator controls a position of an inlet guide vane.

12. The control system of claim 11, wherein the fuel control actuator controls a fuel stroke, and further wherein the air versus fuel model provides a steady-state relationship between a fuel stroke reference and the position of the inlet guide vane.

13. A method of controlling air supply and fuel supply in a gas turbine, including the steps of:

generating a first error signal based on a first condition of the gas turbine;

generating a second error signal based on a second condition of the gas turbine;

generating a third error signal based on a third condition of the gas turbine;

generating a fourth error signal based on a fourth sensed condition of the gas turbine;

processing the first error signal according to a first transfer function to obtain a first loop control signal;

processing the second error signal according to a second transfer function to obtain a second loop control signal;

processing the third error signal according to a third transfer function to obtain a third loop control signal;

processing the fourth error signal according to a fourth transfer function to obtain a fourth loop control signal;

generating a preliminary fuel control signal based on at least one of the first loop control signal and the second loop control signal;

generating a fuel control output signal based on the preliminary fuel control signal;

providing the fuel control output signal to a fuel control actuator;

adjusting, by the fuel control actuator, a fuel flow based on the fuel control output signal;

providing a cross-channel controller;

generating, by the cross-channel controller, using an air versus fuel model, and from the preliminary fuel control signal, an expected steady-state combustion air control signal;

generating a preliminary combustion air control signal based on at least one of the third loop control signal and the fourth loop control signal;

generating a combustion air control output signal based on the preliminary combustion air control signal and the expected steady-state combustion air control signal;

providing the combustion air control output signal to a combustion air control actuator; and adjusting, by the combustion air control actuator, an amount of combustion air based on the combustion air control output signal.

14. The method of claim 13, further comprising the step of automatically adjusting the air versus fuel model, thereby removing a difference between the combustion air control output signal and the expected steady-state combustion air control signal.

15. The method of claim 13, wherein at least one of the first condition, the second condition, the third condition and the fourth condition is an estimated condition.

16. The method of claim 13, wherein at least one of the first condition, the second condition, the third condition and the fourth condition is a sensed condition from a sensor.

17. The method of claim 13, further comprising the step of compensating for response characteristic differences between the fuel control actuator and the combustion air control actuator.

18. The method of claim 17, wherein the step of compensating for response characteristic differences between the fuel control actuator and the combustion air control actuator includes adding a delay to the preliminary fuel control signal.

19. The method of claim 13, wherein the fuel control output signal is equal to the preliminary fuel control signal.

20. The method of claim 13, further comprising the steps of:
- determining a rate of change of the expected steady-state combustion air control signal;
- calculating upper and lower bounds based on the rate of change of the expected steady-state combustion air control signal; and
- applying the upper and lower bounds to the preliminary combustion air control signal.

21. The method of claim 13, wherein at least one of the first condition and the second condition is a rotational speed of the gas turbine, and wherein at least one of the third condition and the fourth condition is an exhaust temperature of the gas turbine.

22. The method of claim 13, wherein the step of adjusting, by the combustion air control actuator, the amount of combustion air includes adjusting a position of an inlet guide vane.

23. The method of claim 22, wherein the step of adjusting, by the fuel control actuator, the fuel flow includes adjusting a fuel stroke, and further wherein the air versus fuel model provides a steady-state relationship between a fuel stroke reference and the position of the inlet guide vane.

* * * * *